(12) United States Patent
Bechta et al.

(10) Patent No.: US 10,880,017 B2
(45) Date of Patent: Dec. 29, 2020

(54) DETECTING A PULSED SIGNAL

(71) Applicant: NOKIA SOLUTIONS AND NETWORKS OY, Espoo (FI)

(72) Inventors: Kamil Bechta, Wroclaw (PL); Fabiano de Sousa Chaves, Wroclaw (PL); Stanislaw Gadzinski, Nowogrodziec (PL); Patryk Paczka, Pobiedziska (PL); Marcin Krzysztof Szczurowski, Wroclaw (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 8 days.

(21) Appl. No.: 16/095,079

(22) PCT Filed: Apr. 20, 2016

(86) PCT No.: PCT/EP2016/058767
§ 371 (c)(1),
(2) Date: Oct. 19, 2018

(87) PCT Pub. No.: WO2017/182071
PCT Pub. Date: Oct. 26, 2017

(65) Prior Publication Data
US 2019/0115985 A1    Apr. 18, 2019

(51) Int. Cl.
*H04L 12/28* (2006.01)
*H04B 15/00* (2006.01)
(Continued)

(52) U.S. Cl.
CPC .............. *H04B 15/00* (2013.01); *G01S 7/021* (2013.01); *H04B 1/10* (2013.01); *H04B 17/318* (2015.01); *H04L 5/0048* (2013.01)

(58) Field of Classification Search
None
See application file for complete search history.

(56) References Cited

U.S. PATENT DOCUMENTS

2011/0261673 A1* 10/2011 Luo ..................... H04B 7/0473
                                                            370/201
2013/0114438 A1* 5/2013 Bhattad ................. H04J 11/005
                                                            370/252
(Continued)

FOREIGN PATENT DOCUMENTS

CN      104 717 661 A    6/2015
EP      2 999 126 A1     3/2016

OTHER PUBLICATIONS

International Search Report & Written Opinion dated Jan. 4, 2017 corresponding to International Patent Application No. PCT/EP2016/058767.

*Primary Examiner* — Elisabeth Benoit Magloire
(74) *Attorney, Agent, or Firm* — Squire Patton Boggs (US) LLP

(57) ABSTRACT

There are provided a method, comprising monitoring if a predefined reference signal is decoded from a received signal, wherein the received signal is received at a predetermined resource element defined by a symbol time and a frequency range; informing a control device on receipt of an interfering pulsed signal if the reference signal is not decoded from the received signal; and a method, comprising monitoring if a total received power on a frequency range oscillates in time during RSRP cannot be calculated in a time period, wherein the frequency range and the time period are allocated to exclusively receiving reference signals; informing a control device on receipt of an interfering pulsed signal if the total received power oscillates in time.

15 Claims, 7 Drawing Sheets

(51) Int. Cl.
    *H04B 1/10*     (2006.01)
    *G01S 7/02*     (2006.01)
    *H04B 17/318*     (2015.01)
    *H04L 5/00*     (2006.01)

(56) References Cited

U.S. PATENT DOCUMENTS

| | | | |
|---|---|---|---|
| 2013/0294333 A1* | 11/2013 | Chen | H04W 28/06 370/328 |
| 2015/0092705 A1* | 4/2015 | Somasundaram | H04W 24/08 370/329 |
| 2015/0146679 A1* | 5/2015 | Lindoff | H04B 1/7103 370/330 |
| 2015/0148050 A1* | 5/2015 | Siomina | H04J 11/005 455/452.1 |
| 2015/0215103 A1* | 7/2015 | Tsai | H04L 25/0202 370/329 |
| 2015/0270918 A1* | 9/2015 | Lee | H04L 27/0012 370/329 |
| 2015/0296508 A1* | 10/2015 | Fan | H04W 72/0446 370/329 |
| 2015/0341949 A1* | 11/2015 | Nagata | H04L 1/0013 370/329 |
| 2016/0080101 A1 | 3/2016 | Naeini et al. | |
| 2016/0269956 A1* | 9/2016 | Sawhney | H04W 36/08 |
| 2016/0294526 A1* | 10/2016 | Kim | H04W 72/042 |
| 2016/0316389 A1* | 10/2016 | Kim | H04B 17/345 |
| 2016/0353330 A1* | 12/2016 | Naik | H04W 36/0022 |
| 2017/0257773 A1* | 9/2017 | Boudreau | G01S 7/021 |
| 2017/0272960 A1* | 9/2017 | Li | H04L 41/0816 |
| 2017/0290016 A1* | 10/2017 | Yi | H04W 48/12 |

\* cited by examiner

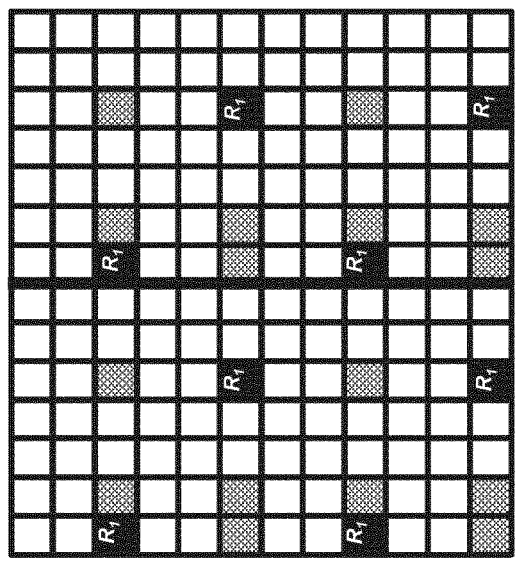
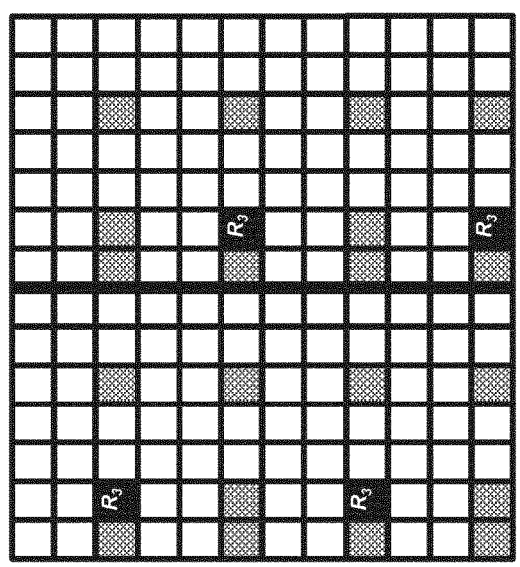
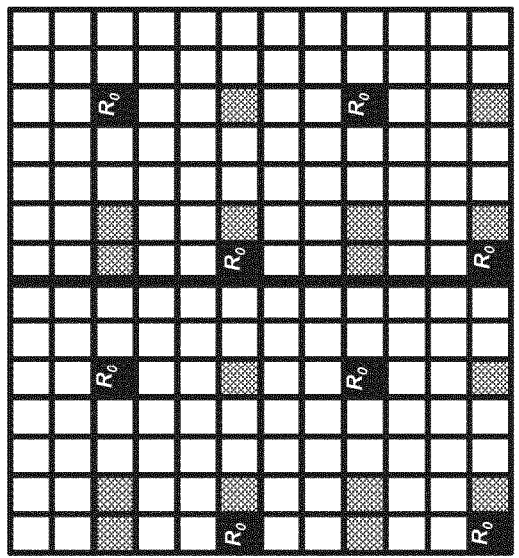
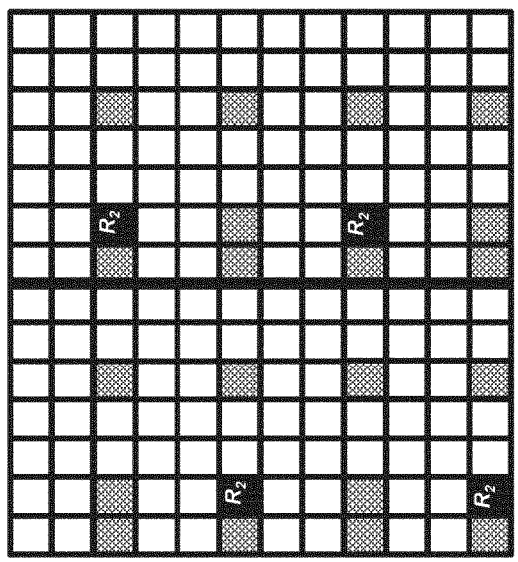
Fig. 2

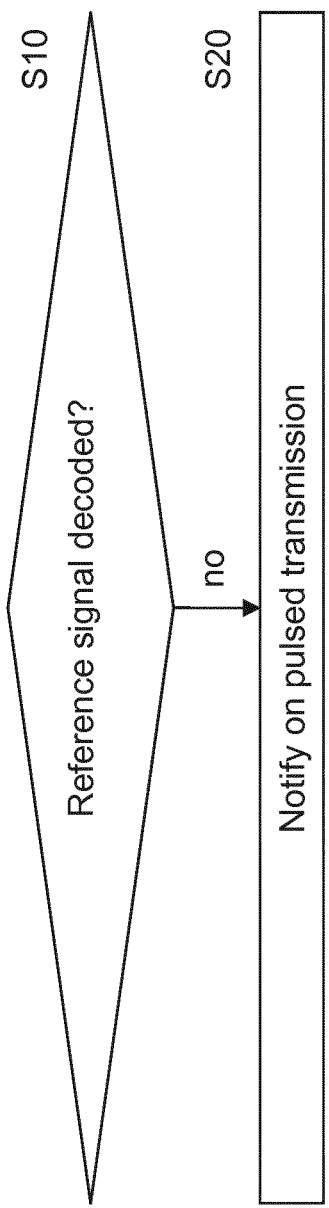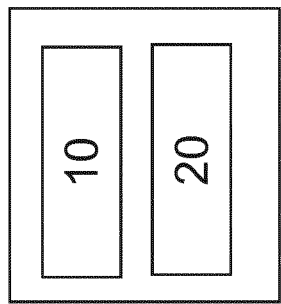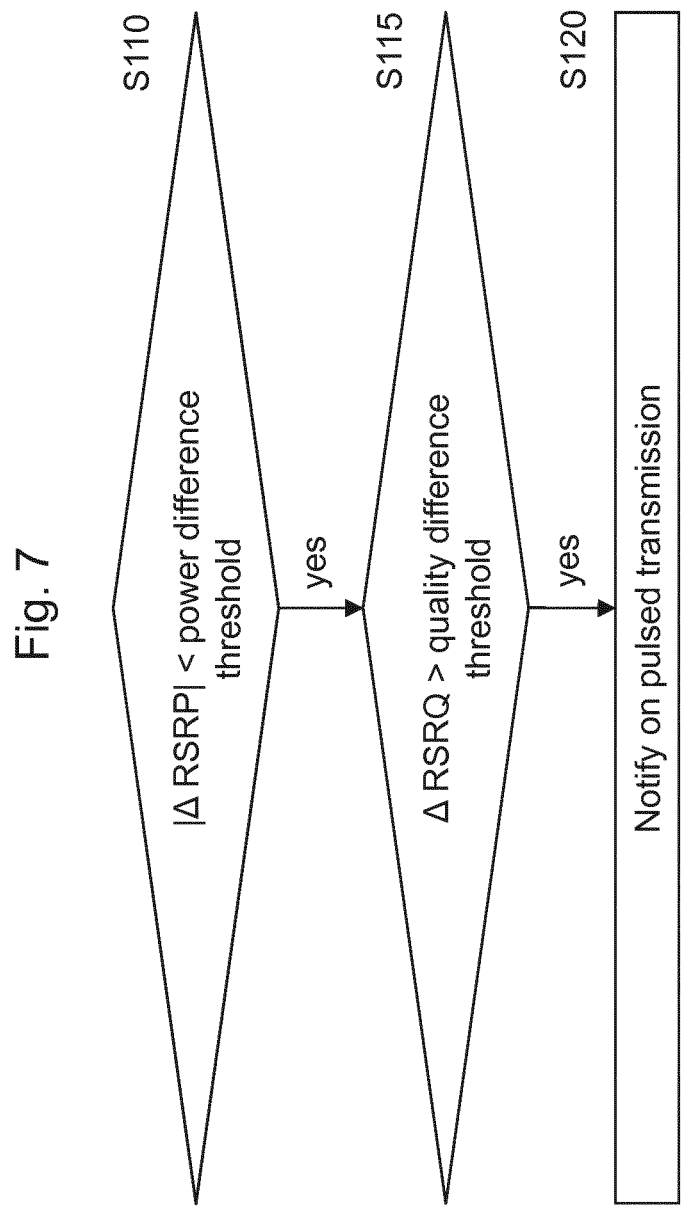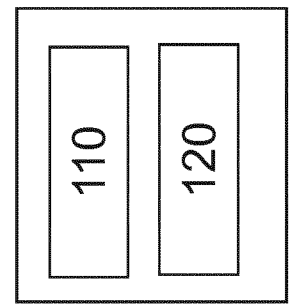

DETECTING A PULSED SIGNAL

FIELD OF THE INVENTION

The present invention relates to an apparatus, a method, and a computer program product related to detecting a pulsed signal. More particularly, the present invention relates to an apparatus, a method, and a computer program product related to detecting the pulsed signal and mitigating interference caused by the pulsed signal.

Abbreviations

3GPP 3$^{rd}$ Generation Partnership Project
AP Access Point
eNB Evolved Node B
BW Bandwidth
CBRS Citizens Broadband Radio Service
CBSD CBRS device
CRS Cell-specific Reference Signals
DL Downlink
ESC Environmental Sensing Capability
FCC Federal Communications Commission
GHz Gigahertz
GPRS General Packet Radio Service
LTE Long Term Evolution
LTE-A LTE Advanced
MBB Mobile Broadband
MBSFN Multicast-Broadcast Single-Frequency Network
MHz Megahertz
PCell Primary Cell
RB Resource Block
RF Radio Frequency
RRC Radio Resource Control
RSRP Reference Signal Received Power
RSRPth RSRP threshold
RSRQ Reference Signal Received Quality
RSRQth RSRQ threshold
RSSI Received Signal Strength Indicator
SAS Spectrum Access System
SINR Signal to Noise and Interference Ratio
TS Technical Specification
TtR Time to Report
UE User Equipment
UMTS Universal Mobile Telecommunications System

BACKGROUND OF THE INVENTION

Increasing demands of end users of Mobile Broadband (MBB) systems on data throughput force MBB network operators and MBB equipment vendors to search for new possibilities of better utilization of Radio Frequency (RF) resources. A critical RF resource is spectrum available for a given RF transmission, i.e. Bandwidth (BW) of channel used for data transmission. Due to the lack of free spectrum in currently used frequency bands, MBB systems are moving to higher frequency bands (above 6 GHz) which occupancy is lower and allow for usage of wider channel bandwidths, nowadays with lower risk of interference with other communication systems. However, radio signal propagation conditions become worse with the increase of carrier frequency due to higher attenuation of transmitted signals. Therefore, to keep suitable coverage of MBB systems, without significant or even prohibitive growth of cells' density, better utilization of currently used frequency bands is necessary. One way to do it is sharing of spectrum used occasionally by incumbent users with MBB systems. This solution requires implementation of mechanisms ensuring minimization of interferences between systems which share the same spectrum.

An example of such solution is SAS (Spectrum Access System) [1] which allows sharing spectrum in frequency range 3550 MHz-3700 MHz between incumbent systems (like radars or fixed satellite services) and CBRS (Citizens Broadband Radio Service). Main mechanism used in SAS to avoid interferences is introduction of Exclusion Zones, i.e. geographical areas where deployment of CBRS devices (CBSD) is not allowed, mainly to protect incumbent systems from noticeable interferences.

Radar operation is based on transmissions of pulsed, high-power signals, which have short time duration (low duty cycle) and relatively short periods (short dwell time). These radar characteristics make spectrum sharing with MBB systems a concrete opportunity, once radar operation can be monitored by MBB systems.

One of the natural candidates among commercially available MBB systems, which can be deployed in shared spectrum band, is Long Term Evolution (LTE) system. One of the fundamentals of LTE system are signal level measurements done by UE in Idle mode (for cell selection and reselection) and in Connected mode (for handover). These measurements are done on currently used frequency (intra-frequency measurements) or other supported frequencies (inter-frequency measurements) as described in clause 8.1.2.2 and 8.1.2.3 of [2] respectively:

"The UE shall be able to identify new intra-frequency cells and perform RSRP measurements of identified intra-frequency cells without an explicit intra-frequency neighbour cell list containing physical layer cell identities. During the RRC_CONNECTED state the UE shall continuously measure identified intra frequency cells and additionally search for and identify new intra frequency cells."

"The UE shall be able to identify new inter-frequency cells and perform RSRP and RSRQ measurements of identified inter-frequency cells if carrier frequency information is provided by the PCell, even if no explicit neighbour list with physical layer cell identities is provided."

Subject of these measurements are mainly RSRP (Reference Signal Received Power) which represents power of signal from serving cell and RSSI (Received Signal Strength Indicator) which represents total received power (total received wideband power), i.e. serving cell signal plus interferences. Based on RSRP and RSSI, UE calculates RSRQ (Reference Signal Received Quality) which is a SINR (Signal to Noise and Interference Ratio) type of metric. RSRP and RSRQ are then reported to the network either periodically or after triggering by a measurement event [3].

In case of SAS, according to [1], work is ongoing on definition of technical details of Environmental Sensing Capability (ESC). ESC is a concept of "one or more commercially operated networks of device-based or infrastructure-based sensors that would be used to detect signals from federal radar systems". ESC would then allow transforming Exclusion Zones into Protection Zones, where deployment of CBSDs is possible. CBSDs would be allowed to provide coverage for end users inside Protection Zone, unless ESC detects operation of incumbent system (e.g. federal radar) and requests SAS to terminate CBRS transmission in affected area. ESC concept requires deployment of dedicated network of spectrum sensors and effective information exchange between ESC, SAS and CBSDs.

References

[1] REPORT AND ORDER AND SECOND FURTHER NOTICE OF PROPOSED RULEMAKING: Amendment of the Commission's Rules with Regard to Commercial Operations in the 3550-3650 MHz Band; FCC 15-47; Apr. 21, 2015
[2] 3GPP TS 36.133 (Release 10)
[3] 3GPP TS 36.331 (Release 10)
[4] 3GPP TS 36.214 (Release 10)

SUMMARY OF THE INVENTION

It is an object of the present invention to improve the prior art.

According to a first aspect of the invention, there is provided an apparatus, comprising monitoring means adapted to monitor if a predefined reference signal is decoded from a received signal, wherein the received signal is received at a predetermined resource element defined by a symbol time and a frequency range; informing means adapted to inform a control device on receipt of an interfering pulsed signal if the reference signal is not decoded from the received signal.

The monitoring means may be adapted to monitor if a power of the received signal is larger than a predefined power threshold; and the apparatus may further comprise inhibiting means adapted to inhibit the informing means from informing the control device if the reference signal is not decoded from the received signal and the power is not larger than the power threshold.

The monitoring means may be adapted to monitor if plural poor signals are received at respective different predetermined symbol times in a predetermined time period, wherein a respective reference signal is not decoded from each of the poor signals; and the apparatus may further comprise prohibiting means adapted to prohibit the informing means to inform the control device if the monitoring means does not monitor that plural poor signals are received.

The apparatus may further comprise analyzing means adapted to analyze if the poor signals are received with a periodicity; wherein at least one of the informing means may be adapted to inform the control device on the periodicity if the poor signals are received with the periodicity; and the prohibiting means may be adapted to prohibit the informing means to inform the control device if the poor signals are not received with the periodicity.

The monitoring means may be adapted to monitor if one or more good signals are received at respective predetermined symbol times between the predetermined symbol times, at which subsequently received poor signals of the poor signals are received, wherein a respective reference signal is decoded from each of the one or more good signals; wherein the prohibiting means may be adapted to prohibit the informing means to inform the control device if a good signal is not received between the subsequently received poor signals.

According to a second aspect of the invention, there is provided an apparatus, comprising monitoring means adapted to monitor if an absolute value of a power difference between a power of a good signal and the power of a poor signal is less than a predefined power difference threshold and if a quality difference between a quality of the good signal and the quality of the poor signal is larger than a predefined quality difference threshold; informing means adapted to inform a control device on receipt of an interfering pulsed signal if the absolute value of the power difference is less than the predefined power difference threshold and the quality difference is larger than the predefined quality difference threshold, wherein a respective predefined reference signal is decoded from each of the good signal and the poor signal, the good signal is received at a predetermined first symbol time, the poor signal is received at a predetermined second symbol time, and the predetermined first symbol time is different from the predetermined second symbol time.

The apparatus may further comprise supervising means adapted to supervise if the quality of the good signal and the quality of the poor signal are both above a predefined quality threshold or if the quality of the good signal and the quality of the poor signal are both below the predefined quality threshold; inhibiting means adapted to inhibit the informing means from informing the control device if the quality of the good signal and the quality of the poor signal are both above the predefined quality threshold or if the quality of the good signal and the quality of the poor signal are both below the predefined quality threshold.

The monitoring means may be adapted to monitor if plural poor signals are received at respective different predetermined symbol times in a predetermined time period; a respective reference signal may be decoded from each of the poor signals; the absolute values of the power differences between the good signal and each of the poor signals may be less than the power difference threshold, the quality differences between the good signal and each of the poor signals may be larger than the quality difference threshold; and the apparatus may further comprise prohibiting means adapted to prohibit the informing means to inform the control device if the monitoring means does not monitor that plural poor signals are received.

The apparatus may further comprise analyzing means adapted to analyze if the poor signals are received with a periodicity; wherein at least one of the informing means may be adapted to inform the control device on the periodicity if the poor signals are received with the periodicity; and the prohibiting means may be adapted to prohibit the informing means to inform the control device if the poor signals are not received with the periodicity.

The monitoring means may be adapted to monitor if one or more good signals are received at respective predetermined symbol times between the predetermined symbol times at which subsequent poor signals of the poor signals are received, a respective reference signal may be decoded from each of the good signals; the absolute values of the power differences between each of the good signals and each of the poor signals may be less than the power difference threshold, the quality differences between each of the good signals and each of the poor signals may be larger than the quality difference threshold; and the apparatus may further comprise prohibiting means adapted to prohibit the informing means to inform the control device if a good signal is not received between the subsequently received poor signals.

According to a third aspect of the invention, there is provided an apparatus, comprising monitoring means adapted to monitor if a total received power on a frequency range oscillates in time during a time period, wherein the frequency range and the time period are allocated to exclusively receiving reference signals; informing means adapted to inform a control device on receipt of an interfering pulsed signal if the total received power oscillates in time.

The apparatus may further comprise supervising means adapted to supervise if an amplitude difference between a maximum of the total received power and a minimum of the total received power is larger than a predetermined amplitude difference threshold; inhibiting means adapted to inhibit the informing means from informing the control device if the amplitude difference is not larger than the predefined amplitude difference threshold.

The apparatus may further comprise analyzing means adapted to analyze if the total received power oscillates with a periodicity; wherein at least one of the informing means may be adapted to inform the control device on the periodicity if the total received power oscillates with the periodicity; and the apparatus may comprise a prohibiting means adapted to prohibit the informing means to inform the control device if the total received power does not oscillate with the periodicity.

The apparatus may further comprise delaying means adapted to delay the informing of the control device by the informing means by a predetermined reporting time.

The apparatus may further comprise supervising means adapted to supervise if an indication of a potential presence of the pulsed signal is received; inhibiting means adapted to inhibit at least one of the monitoring means from monitoring and the informing means from informing if the indication is not received.

According to a fourth aspect of the invention, there is provided an apparatus, comprising monitoring means adapted to monitor if an information is received from a terminal, according to which the terminal receives an interfering pulsed signal; modifying means adapted to modify, if the information is received, a resource allocation for the terminal such that an interference with the pulsed signal is avoided.

The modifying means may be adapted to inhibit an allocation of a resource at at least one of a frequency of the pulsed signal and a time of the pulsed signal, wherein the resource is allocated to the terminal for receiving a downlink signal or transmitting an uplink signal.

The apparatus may further comprise determining means adapted to determine if the terminal is located in an area where the pulsed signal is potentially present; and at least one of indicating means adapted to indicate to the terminal that the pulsed signal is potentially present if it is determined that the terminal is located in the area; and controlling means adapted to control a transmitting device to transmit respective reference signals at all resource elements of a resource block if it is determined that the terminal is located in the area.

According to a fifth aspect of the invention, there is provided an apparatus, comprising monitoring circuitry configured to monitor if a predefined reference signal is decoded from a received signal, wherein the received signal is received at a predetermined resource element defined by a symbol time and a frequency range; informing circuitry configured to inform a control device on receipt of an interfering pulsed signal if the reference signal is not decoded from the received signal.

The monitoring circuitry may be configured to monitor if a power of the received signal is larger than a predefined power threshold; and the apparatus may further comprise inhibiting circuitry configured to inhibit the informing circuitry from informing the control device if the reference signal is not decoded from the received signal and the power is not larger than the power threshold.

The monitoring circuitry may be configured to monitor if plural poor signals are received at respective different predetermined symbol times in a predetermined time period, wherein a respective reference signal is not decoded from each of the poor signals; and the apparatus may further comprise prohibiting circuitry configured to prohibit the informing circuitry to inform the control device if the monitoring circuitry does not monitor that plural poor signals are received.

The apparatus may further comprise analyzing circuitry configured to analyze if the poor signals are received with a periodicity; wherein at least one of the informing circuitry may be configured to inform the control device on the periodicity if the poor signals are received with the periodicity; and the prohibiting circuitry may be configured to prohibit the informing circuitry to inform the control device if the poor signals are not received with the periodicity.

The monitoring circuitry may be configured to monitor if one or more good signals are received at respective predetermined symbol times between the predetermined symbol times, at which subsequently received poor signals of the poor signals are received, wherein a respective reference signal is decoded from each of the one or more good signals; wherein the prohibiting circuitry may be configured to prohibit the informing circuitry to inform the control device if a good signal is not received between the subsequently received poor signals.

According to a sixth aspect of the invention, there is provided an apparatus, comprising monitoring circuitry configured to monitor if an absolute value of a power difference between a power of a good signal and the power of a poor signal is less than a predefined power difference threshold and if a quality difference between a quality of the good signal and the quality of the poor signal is larger than a predefined quality difference threshold; informing circuitry configured to inform a control device on receipt of an interfering pulsed signal if the absolute value of the power difference is less than the predefined power difference threshold and the quality difference is larger than the predefined quality difference threshold, wherein a respective predefined reference signal is decoded from each of the good signal and the poor signal, the good signal is received at a predetermined first symbol time, the poor signal is received at a predetermined second symbol time, and the predetermined first symbol time is different from the predetermined second symbol time.

The apparatus may further comprise supervising circuitry configured to supervise if the quality of the good signal and the quality of the poor signal are both above a predefined quality threshold or if the quality of the good signal and the quality of the poor signal are both below the predefined quality threshold; inhibiting circuitry configured to inhibit the informing circuitry from informing the control device if the quality of the good signal and the quality of the poor signal are both above the predefined quality threshold or if the quality of the good signal and the quality of the poor signal are both below the predefined quality threshold.

The monitoring circuitry may be configured to monitor if plural poor signals are received at respective different predetermined symbol times in a predetermined time period; a respective reference signal may be decoded from each of the poor signals; the absolute values of the power differences between the good signal and each of the poor signals may be less than the power difference threshold, the quality differences between the good signal and each of the poor signals may be larger than the quality difference threshold; and the apparatus may further comprise prohibiting circuitry configured to prohibit the informing circuitry to inform the control device if the monitoring circuitry does not monitor that plural poor signals are received.

The apparatus may further comprise analyzing circuitry configured to analyze if the poor signals are received with a periodicity; wherein at least one of the informing circuitry may be configured to inform the control device on the periodicity if the poor signals are received with the periodicity; and the prohibiting circuitry may be configured to prohibit the informing circuitry to inform the control device if the poor signals are not received with the periodicity.

The monitoring circuitry may be configured to monitor if one or more good signals are received at respective predetermined symbol times between the predetermined symbol times at which subsequent poor signals of the poor signals are received, a respective reference signal may be decoded from each of the good signals; the absolute values of the power differences between each of the good signals and each of the poor signals may be less than the power difference threshold, the quality differences between each of the good signals and each of the poor signals may be larger than the quality difference threshold; and the apparatus may further comprise prohibiting circuitry configured to prohibit the informing circuitry to inform the control device if a good signal is not received between the subsequently received poor signals.

According to a seventh aspect of the invention, there is provided an apparatus, comprising monitoring circuitry configured to monitor if a total received power on a frequency range oscillates in time during a time period, wherein the frequency range and the time period are allocated to exclusively receiving reference signals; informing circuitry configured to inform a control device on receipt of an interfering pulsed signal if the total received power oscillates in time.

The apparatus may further comprise supervising circuitry configured to supervise if an amplitude difference between a maximum of the total received power and a minimum of the total received power is larger than a predetermined amplitude difference threshold; inhibiting circuitry configured to inhibit the informing circuitry from informing the control device if the amplitude difference is not larger than the predefined amplitude difference threshold.

The apparatus may further comprise analyzing circuitry configured to analyze if the total received power oscillates with a periodicity; wherein at least one of the informing circuitry may be configured to inform the control device on the periodicity if the total received power oscillates with the periodicity; and the apparatus may comprise a prohibiting circuitry configured to prohibit the informing circuitry to inform the control device if the total received power does not oscillate with the periodicity.

The apparatus may further comprise delaying circuitry configured to delay the informing of the control device by the informing circuitry by a predetermined reporting time.

The apparatus may further comprise supervising circuitry configured to supervise if an indication of a potential presence of the pulsed signal is received; inhibiting circuitry configured to inhibit at least one of the monitoring circuitry from monitoring and the informing circuitry from informing if the indication is not received.

According to a eighth aspect of the invention, there is provided an apparatus, comprising monitoring circuitry configured to monitor if an information is received from a terminal, according to which the terminal receives an interfering pulsed signal; modifying circuitry configured to modify, if the information is received, a resource allocation for the terminal such that an interference with the pulsed signal is avoided.

The modifying circuitry may be configured to inhibit an allocation of a resource at at least one of a frequency of the pulsed signal and a time of the pulsed signal, wherein the resource is allocated to the terminal for receiving a downlink signal or transmitting an uplink signal.

The apparatus may further comprise determining circuitry configured to determine if the terminal is located in an area where the pulsed signal is potentially present; and at least one of indicating circuitry configured to indicate to the terminal that the pulsed signal is potentially present if it is determined that the terminal is located in the area; and controlling circuitry configured to control a transmitting device to transmit respective reference signals at all resource elements of a resource block if it is determined that the terminal is located in the area.

According to a ninth aspect of the invention, there is provided a method, comprising monitoring if a predefined reference signal is decoded from a received signal, wherein the received signal is received at a predetermined resource element defined by a symbol time and a frequency range; informing a control device on receipt of an interfering pulsed signal if the reference signal is not decoded from the received signal.

According to a tenth aspect of the invention, there is provided a method, comprising monitoring if an absolute value of a power difference between a power of a good signal and the power of a poor signal is less than a predefined power difference threshold and if a quality difference between a quality of the good signal and the quality of the poor signal is larger than a predefined quality difference threshold; informing a control device on receipt of an interfering pulsed signal if the absolute value of the power difference is less than the predefined power difference threshold and the quality difference is larger than the predefined quality difference threshold, wherein a respective predefined reference signal is decoded from each of the good signal and the poor signal, the good signal is received at a predetermined first symbol time, the poor signal is received at a predetermined second symbol time, and the predetermined first symbol time is different from the predetermined second symbol time.

According to an eleventh aspect of the invention, there is provided a method, comprising monitoring if a total received power on a frequency range oscillates in time during a time period, wherein the frequency range and the time period are allocated to exclusively receiving reference signals; informing a control device on receipt of an interfering pulsed signal if the total received power oscillates in time.

According to a twelfth aspect of the invention, there is provided a method, comprising monitoring if an information is received from a terminal, according to which the terminal receives an interfering pulsed signal; modifying, if the information is received, a resource allocation for the terminal such that an interference with the pulsed signal is avoided.

Each of the methods of the ninth to twelfth aspects may be a method of detecting a pulsed signal.

According to a thirteenth aspect of the invention, there is provided an apparatus comprising at least one processor, at least one memory including computer program code, and the at least one processor, with the at least one memory and the computer program code, being arranged to cause the apparatus to at least perform at least one of the methods according to at least one of the ninth to twelfth aspects.

According to a fourteenth aspect of the invention, there is provided a computer program product comprising a set of instructions which, when executed on an apparatus, is configured to cause the apparatus to carry out the method according to at least one of the ninth to twelfth aspects. The computer program product may be embodied as a computer-readable medium or directly loadable into a computer.

According to some example embodiments of the invention, at least one of the following technical effects may be provided:

dedicated sensors (additional to those available in the UE to operate in the MBB network) are not needed for detecting the pulsed transmission;

short delay for detecting the pulsed transmission and mitigating/avoiding potential interference;

Accuracy of detection of the pulsed transmission is adaptable;

Processing power of UE may be saved.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of example embodiments of the present invention which is to be taken in conjunction with the appended drawings, wherein

FIG. 2 shows the mapping of CRS for antenna ports 0 to 3;

FIG. 6 shows an apparatus according to an example embodiment of the invention;

FIG. 7 shows a method according to an example embodiment of the invention;

FIG. 8 shows an apparatus according to an example embodiment of the invention;

FIG. 9 shows a method according to an example embodiment of the invention;

DETAILED DESCRIPTION OF CERTAIN EXAMPLE EMBODIMENTS

Figure 1:
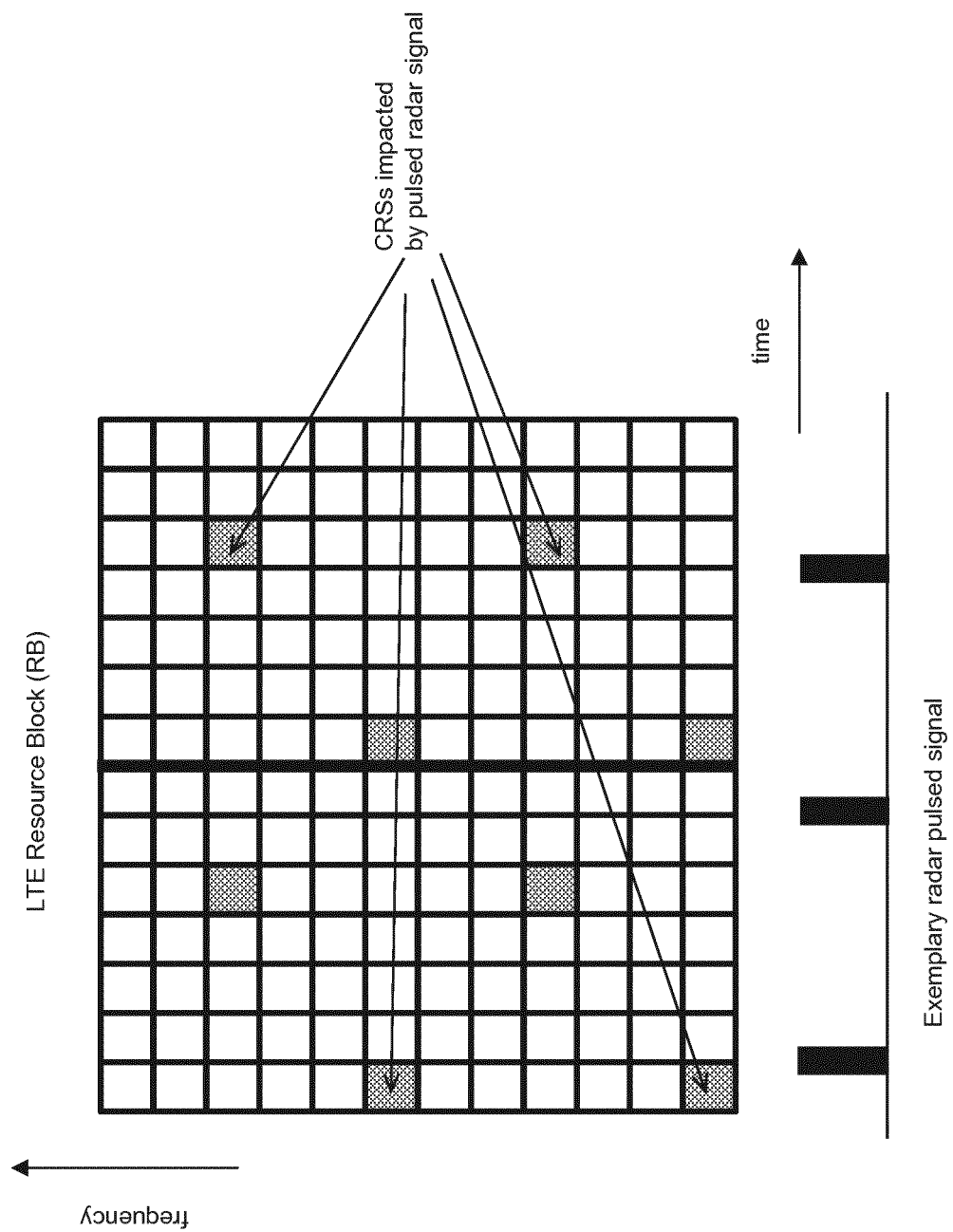
FIG. 1 illustrates how radar transmissions may appear in time as interference to MBB systems.

Herein below, certain example embodiments of the present invention are described in detail with reference to the accompanying drawings, wherein the features of the example embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Protection of incumbent systems from interferences caused by MBB systems, which share the same spectrum, by spatial separation is ineffective from the point of view of MBB systems deployment and coverage. In other words— determination of areas where MBB systems shall not be deployed (e.g. Exclusion Zones in SAS) blocks the access to MBB system for end users staying in this area.

This problem is particularly visible in cases when incumbent systems are ship-born radars operating close to seashore. Because seashore areas usually are more populated than in-land areas, significant number of end users will not be allowed to access MBB system. This issue noticeably limits usability of spectrum sharing concept, as occasionally used spectrum is still underutilized in excluded areas, and makes deployment of MBB systems in shared spectrum bands less effective or even unprofitable.

A more efficient spectrum sharing for MBB system use according to some embodiments of the invention essentially depends on monitoring opportunities to share the spectrum, which means identifying the presence of active spectrum usage by incumbent systems in a given region, and sharing this information with the relevant entities in the MBB network (e.g. base stations or central spectrum controller). After such monitoring process, a number of possible decisions or solutions may take place to improve or enable spectrum sharing without loss for incumbents.

Embodiments of this invention address the problem of monitoring incumbent system activity in the case where incumbents have pulsed transmissions, as radars. They may include one or more of the detection of pulsed transmissions, the identification of their transmission patterns, the flow of this information within MBB network, and the deciding by the respective control entity.

That is, some embodiments of this invention aim to provide a solution for effective monitoring, by the MBB system, of spectrum shared with incumbent system characterized by pulsed transmissions, such as radars. This spectrum monitoring is composed of at least two tasks: detection of incumbent operation (i.e. pulsed transmissions by the incumbent system), and sharing this information with relevant MBB system entities (i.e., relevant for resource allocation in the MBB system). The identification of incumbent transmission pattern (e.g. time duration and periodicity) is of great relevance to advanced spectrum shared solutions, and is also solved by some embodiments of the invention.

Some embodiments of the invention are based on the existing framework of measurements and reports in the LTE network. That is, these solutions are based on event triggered User Equipment (UE) reporting to eNB (Evolved Node B) of LTE system in order to realize the detection (and possibly the pattern) of incumbent radar pulsed transmissions. Detection and pattern acquisition of incumbent radar transmissions may be tasks performed by UE from signal strength and signal quality measurements.

During a given measurement time window, MBB desired signal strength has low variation, while high power pulsed radar transmissions cause high interference during some time intervals and no interference during others, due to discontinuous transmission into the space segment where the UE is located. Therefore, it is possible that high power radar interference make MBB desired signal not recognizable/decodable by UE. Additionally, an UE may be able to recognize the oscillating behaviour of interference or signal quality measurements in time, while the desired signal remains at substantially same levels. Such measurement results are events to trigger UE reporting to eNB about the operation of incumbent radar in its area. In addition, UE may report specific characteristics of the radar operation (e.g. time duration and periodicity).

eNB which receives this report can undertake any action necessary to protect detected incumbent system from interference (e.g. avoid scheduling transmissions, update information in spectrum allocation control entities, etc.). Differently from the discussed prior art, by this solution, incumbent system operation can be detected without external sensors, avoiding additional communication (and potential delay or other fault problems) with an external sensor network.

An MBB system (e.g. an LTE or LTE-A network including its UEs), during monitoring of a shared spectrum, may perform at least one of the following two tasks: detection of incumbent operation, and sharing this information with relevant MBB system entities which may take necessary actions to mitigate/avoid interference. Specific transmission characteristics of incumbent systems, such as radars, i.e. high power pulsed transmissions with low duty cycle and short dwell time make such transmissions detectable by measurements of a UE of the MBB system. In some embodiments of the invention, the transmission pattern of the incumbent system, such as time duration and periodicity, may be identified.

FIG. 1 illustrates how radar transmissions may appear in time as interference to MBB systems. In this figure, the time evolution inside an LTE Resource Block (RB) is shown in a symbol time scale. Periodic (relatively low period) short time radar transmissions impact a few consecutive symbols, while a number of subsequent symbols are not affected due to the absence of radar signals. Dark resource elements carry a reference signal (e.g. CRS) while the white resource elements do not carry a reference signal. At the bottom, the pulsed radar signal is shown. The time axis (horizontal axis) is the same for the LTE RB and the pulsed radar signal shown in FIG. 1. As may be seen from FIG. 1, only some of the CRS are affected by the pulsed radar transmission, whereas other CRS are not affected.

Note that a RB consists of a predefined number of resource elements (small squares inside the RB of FIG. 1), wherein each resource element is defined by a time period and a frequency range. The time periods of the resource elements and the frequency ranges of the resource elements inside a RB are consecutive. For each resource element in the RB having a certain time period, there are a predefined number of resource elements of the same time period with different frequency ranges. For each resource element in the RB having a certain frequency range, there are a predefined number of resource elements of the same frequency range with different time periods. In the time domain, each RB consists of two subframes of equal time duration (i.e. of an equal number of resource elements with a same frequency range).

If a UE recognizes such interference behaviour, it may report, to the eNB, the operation of an incumbent radar in the area where the UE is located. Once this information reaches the eNB, one or more decisions or actions can be taken to protect the incumbent system from interference and/or to protect the MBB system from interference, such as avoiding scheduling transmissions at times and/or frequencies at which a radar transmission is expected, updating information in spectrum allocation control entities (e.g. SAS), etc.

Implementation of these tasks, i.e. monitoring and detection of pulsed transmissions, acquisition of information about the transmission pattern, and sharing of this information with relevant network entities, is detailed below, taking an LTE system as an example MBB system:

i. Detection (and Pattern Information Acquisition) of Pulsed Transmission From Incumbent System According to some embodiments of the invention, the UE may detect a radar transmission by at least one of the following Events 1 to 3.

a. Event 1: Non-Decodable/Recognizable Reference Signals

In LTE, eNB transmits Cell-specific Reference Signals (CRS) in some resource elements in every DL subframe (1 ms in LTE). CRS can vary their location in frequency (different subcarriers), but have fixed location in time according to the antenna port. FIG. 2 shows the mapping of CRS for antenna ports 0 to 3 in a single RB in frequency for normal cyclic prefix case. In FIG. 2, the CRS of each of the antenna parts 0 to 3 are marked by $R_n$ (n=0, 1, 2, 3). In each of the four RBs shown in FIG. 2, the resource elements of the CRS of the other ports are darkened. The white resource blocks do not carry a CRS.

In the Example shown in FIG. 2, unless radar transmissions have duration not longer than the duration of 2 LTE symbols (less than 150 microseconds), and a time period multiple of LTE slot time (0.5 milliseconds), radar signals will coincide in time with some CRS. In other LTE configurations, as for extended cyclic prefix or Multicast-Broadcast Single-Frequency Network (MBSFN), CRS mapping presents shorter gaps in time, i.e. only radar transmission with a duration as short as 1 LTE symbol do not coincide with some CRS. As radars usually transmit at high power, radar signals coinciding with CRS are able to make UEs losing the ability to decode/recognize CRS, which is equivalent to disability to calculate RSRP. This event (Event 1) may be used to detect an incumbent radar transmission.

In some embodiments, the UE sends measurement report only if the Event 1 occurs several times in a given time period (e.g. TtR, see below), wherein signals are received between the signals from which a CRS cannot be decoded, from which a CRS can be decoded. In some of these embodiments, it is checked if the signals, from which a CRS cannot be decoded (Event 1), have a periodicity. Periodicity may be detected e.g. by a Fourier analysis or a Fast Fourier analysis of a graph showing the occurrences of successful and unsuccessful decodings over time. If they do not have a periodicity, it is not assumed that a pulsed transmission is detected. Here, "periodicity" includes a case where the period cannot be determined exactly but with some acceptable error. Such an error might be caused e.g. by the sampling of the radar signal with the fixed period of CRS, which may be incommensurate to the period of the radar transmission. By looking for plural occurrences of Event 1 or a periodicity of these occurrences, the accuracy of detection (probability of wrong positive detections or wrong negative detections) may be adapted to the specific needs.

Figure 3:
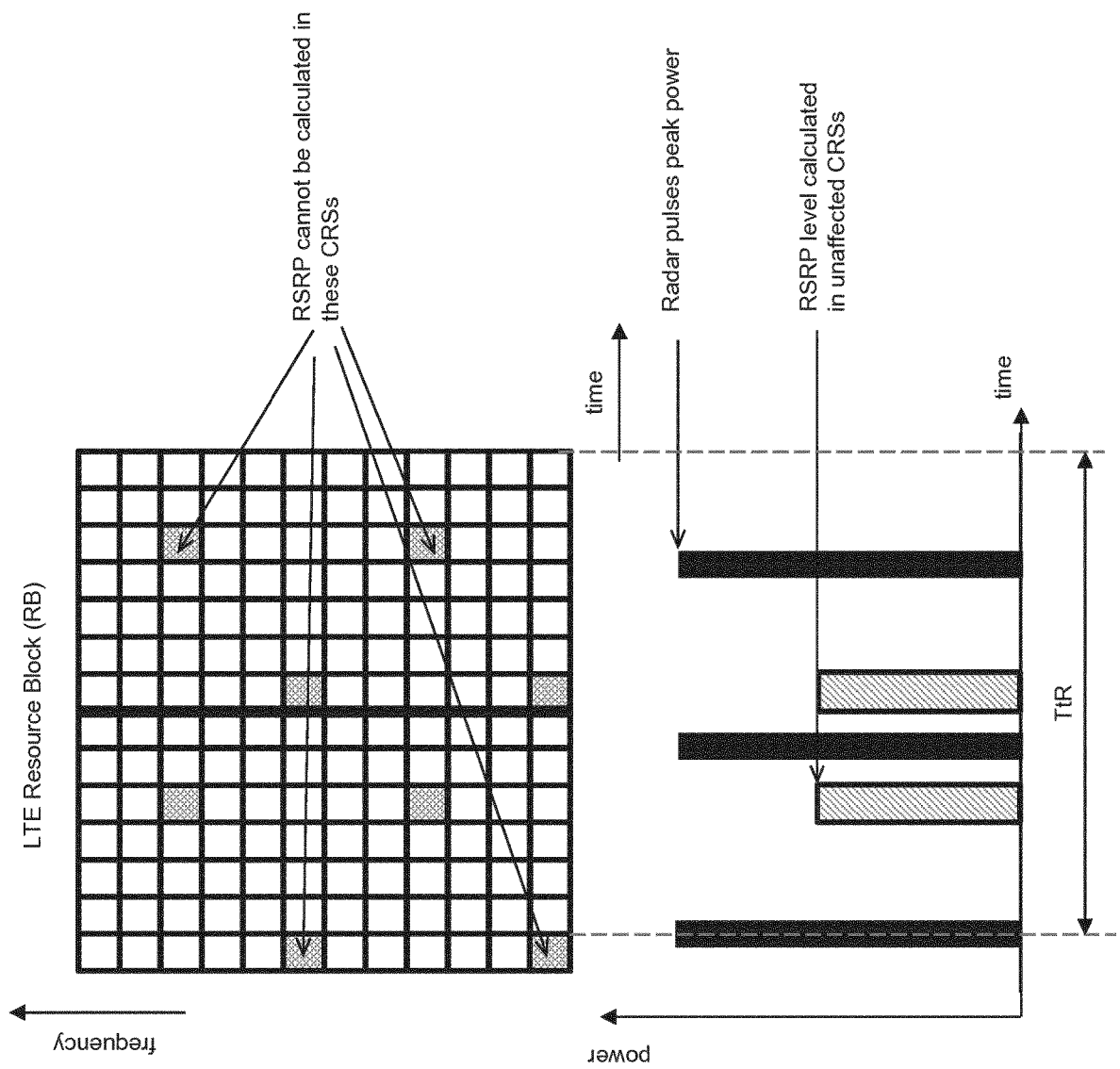
FIG. 3 illustrates Event 1 according to an example embodiment of the invention.

FIG. 3 illustrates Event 1. FIG. 3 is based on the scenario illustrated in FIG. 1. In the top part, an LTE RB with CRS is shown, correspondingly to the top part of FIG. 1. In the bottom part of FIG. 3, the signal power received at the UE at symbol times, at which CRS is expected is shown (the received power at symbol times without CRS is not shown). The received power is measured over the time and frequency range of the respective resource element. As may be seen from the bottom part of FIG. 3, the wanted signal received power (RSRP level) at symbol times, where CRS is expected and the radar transmission is not received is shown (diagonal line filled bars), while at symbol times which are affected by the radar transmission, CRS is not decodable and RSRP level cannot be calculated, due to high power of received radar pulses (black filled bars). For simplicity, the RSRP levels at symbol times not affected by radar transmission are shown with a same height but these heights may be different. Correspondingly, the radar pulses power levels are shown with a same height, but these heights may be different. However, the powers of received signals which are affected by radar pulses and of those which are not affected by radar pulses are clearly different from each other. E.g., the lowest power of the powers of received signals affected by a radar pulse may be at least 30%, preferably at least 50%, and more preferably at least 100% larger than the maximum power of the powers of received signals not affected by a radar pulse.

In some embodiments of the invention, in case that a reference signal cannot be decoded from the received signal, it is checked if the power of the received signal is larger than a predetermined threshold. If the power is less than the threshold, it is assumed that the decoding is not possible due to other reasons than a pulsed radar transmission. In these cases, the UE does not inform the eNB on the occurrence of a pulsed signal.

b. Event 2: Consistent RSRP, Abruptly Degraded RSRQ

In LTE, RSRP and RSRQ are based on CRS measurements. While RSRP relates to the desired signal received power, RSRQ is a quality measure that takes interference into account.

Therefore, if radar signal transmissions coinciding with CRS are such that the UE is still able to decode CRS and perform RSRP/RSRQ measurements, then it will observe consistent RSRP levels (i.e., the RSRP levels are substantially the same, which means that the absolute value of the difference between RSRP levels at two symbol times is less than a predefined threshold, such as less than 20%, preferably less than 10%, more preferably less than 5% of e.g. an average of the RSRP levels or of one of the RSRP levels under consideration) and an abrupt degradation on RSRQ levels. That is, a difference of the RSRQ levels at the two symbol times with substantially the same RSRP level is larger than a predetermined threshold. For example, the threshold may be at least 20% of the higher RSRQ level, preferably at least 40% of the higher RSRQ level, and more preferably at least 60% of the higher RSRQ level. If plural signals with high RSRQ level are evaluated, the threshold may be based on an average of these RSRQ levels or based on one of these RSRQ levels such as a maximum or a minimum thereof. This event (Event 2) may be used to detect an incumbent radar transmission.

The signals and reference signals with the higher quality may also be denoted as good signals and good reference signals, respectively, and the signals and reference signals with the worse quality may also be denoted as poor signals and poor reference signals.

In some embodiments of the invention, when Event 2 occurs, it is additionally checked if the degraded RSRQ is below a predetermined threshold. Only if the degraded RSRQ is below this threshold, it is considered that a pulsed radar transmission is detected. The threshold may be predefined or configured by the network. For example, the threshold may be 19.5 dB, which is the RSRQ_00 reported value according to 3GPP TS 36.133, but it is not limited to this particular value.

In some embodiments, the UE sends a measurement report only if the Event 2 occurs several times in a given time period (e.g. TtR, see below), wherein signals are received between the signals with consistent RSRP but degraded RSRQ, which have a consistent RSRP and a consistent (not degraded) RSRQ. In some of these embodiments, it is checked if the signals with consistent RSRP and degraded RSRQ (Event 2), have a periodicity. Periodicity may be detected e.g. by a Fourier analysis or a Fast Fourier analysis of a graph showing the occurrences of degraded and non-degraded RSRQ (with consistent RSRP) over time. If they do not have a periodicity, it is not assumed that a pulsed transmission is detected. Here, "periodicity" includes a case where the period cannot be determined exactly but with some acceptable error. Such an error might be caused e.g. by the sampling of the radar signal with the fixed period of CRS, which may be incommensurate to the period of the radar transmission. By looking for plural occurrences of Event 2 or a periodicity of these occurrences, the accuracy of detection (probability of wrong positive detections or wrong negative detections) may be adapted to the specific needs.

Figure 4:
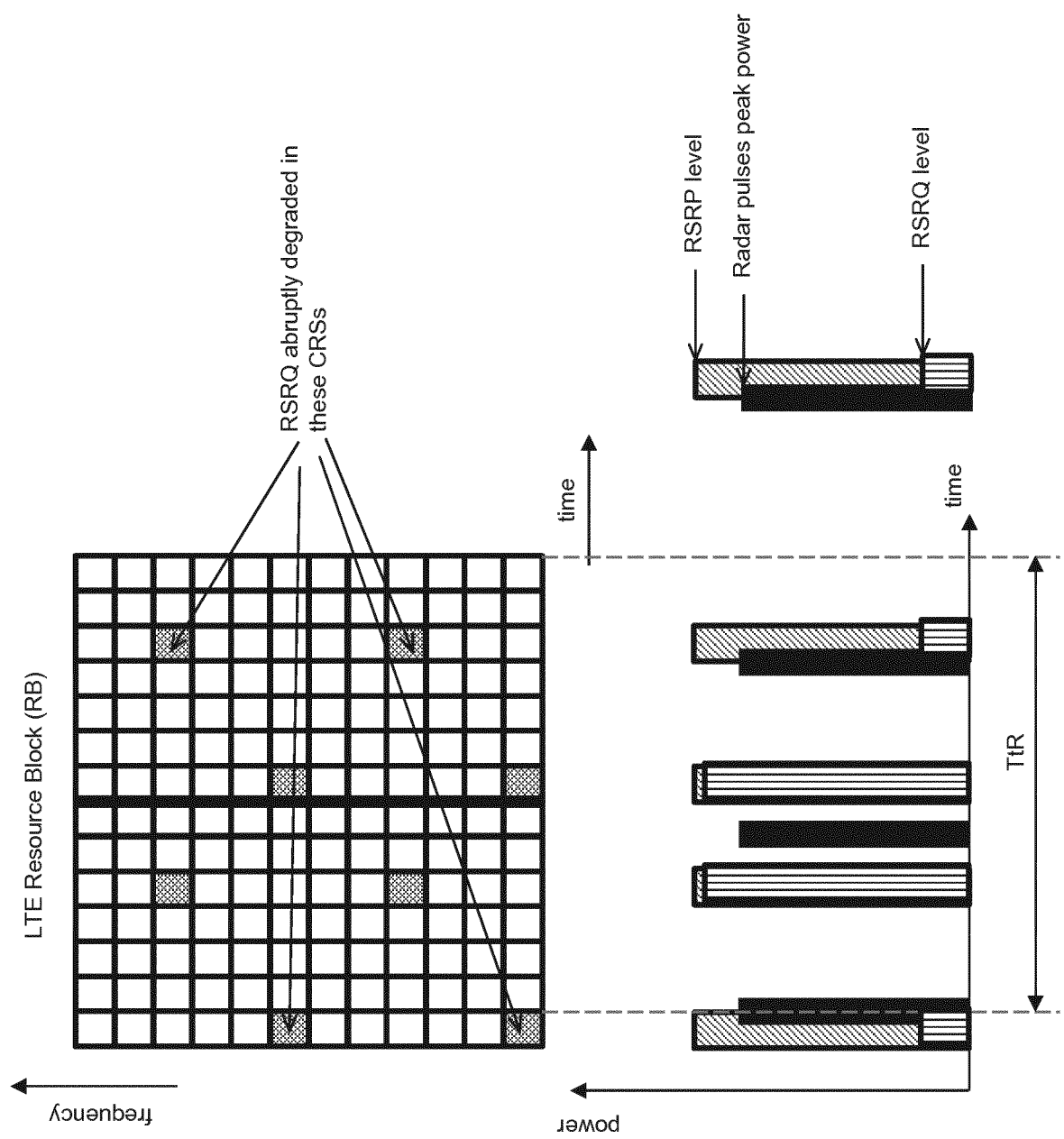
FIG. 4 illustrates Event 2 according to an example embodiment of the invention.

FIG. 4 illustrates Event 2. FIG. 4 is based on the scenario illustrated in FIG. 1. In the top part, an LTE RB with CRS is shown, correspondingly to the top part of FIG. 1. In the bottom part of FIG. 4, the signal power received at the UE at symbol times, at which CRS is expected is shown (the received power at symbol times without CRS is not shown). The received power is measured over the time and frequency range of the respective resource element. As may be seen from the bottom part of FIG. 4, the signal received power (RSRP level, diagonal line filled bars) at symbol times, where CRS is expected and the radar transmission is not received is substantially the same as the RSRP level at symbol times where CRS is expected and the radar transmission (black filled bars) is received. On the other hand, the RSRQ level (vertically hashed bars) at symbol times with radar transmission is substantially lower than that at symbol times not affected by radar transmission. For simplicity, all the RSRP levels are shown with a same height but these heights may be different. In particular, RSRP level at symbol times with radar transmission may be slightly higher than RSRP level at symbol times without radar transmission. Correspondingly, the radar pulses power levels are shown with a same height, but these heights may be different. Also, the quality (RSRQ) of the signals received at symbol times affected by radar transmission is the same. However, these heights may be different from each other. Furthermore, the quality (RSRQ) of the signals received at symbol times not affected by radar transmission is the same. However, these heights may be different from each other. However, the quality of received signals which are affected by radar pulses is clearly different from the quality of received signals which are not affected by radar pulses. E.g., the maximum quality of the received signals affected by radar transmission is at least 30% smaller than the minimum quality of the received signals not affected by radar transmission.

c. Event 3: Oscillating RSSI

In LTE, RSRQ is an average measure based on RSRP and RSSI measurements done in LTE symbols containing CRS, i.e. RSRQ=N×RSRP/RSSI, where N is the number of RB's of RSSI measurement bandwidth. It is also defined in LTE specifications [4] that "If higher-layer signalling indicates certain subframes for performing RSRQ measurements, then RSSI is measured over all OFDM symbols in the indicated subframes". Therefore, according to some embodiments, UEs are set by the eNB to measure RSSI over all OFDM symbols of a particular RB, wherein, in the particular RB, all resource elements include CRSs. This allows the UE to observe the interference variation in a time scale of LTE symbol by performing RSSI measurements per symbol time. In the presence of pulsed radar transmissions, the UE will observe oscillating RSSI, wherein a difference between a maximum RSSI and a minimum RSSI is larger than a predefined threshold. This event (Event 3) may be used to detect an incumbent radar transmission.

For example, oscillating RSSI may be detected if RSSI within one or more subsequent subframes is higher than an upper threshold (which may depend on the RSSI themselves) at at least two different symbol times, and in between lower than a lower threshold, wherein the lower threshold is lower than the upper threshold. As another example, oscillating RSSI may be detected if RSSI within one or more subsequent subframes is lower than a predefined lower threshold (which may depend on the RSSI themselves) at at least two symbol times, and in between higher than an upper threshold, wherein the lower threshold is lower than the upper threshold. As still another example, oscillating RSSI may be detected if an absolute difference between RSSI of one received signal and RSSI of another signal is less than a difference of the RSSI of the one signal and RSSI of a third signal received between the one and the other signal. As a still further example, Fourier analysis or Fast Fourier analysis may be used to detect if RSSI oscillates (which may also be used to detect if RSSI oscillates periodically, see below).

In some embodiments of the invention, when Event 3 occurs, it may be additionally checked if the maximum RSSI is larger than a certain level in order to consider that a pulsed radar transmission is detected. Each of the threshold for the difference between maximum RSSI and minimum RSSI and the certain level to be exceeded by the maximum RSSI may be predefined or configured by the network.

Additionally, by this per symbol time RSSI measurement, the UE may be able to acquire information on the duration and/or periodicity of pulsed radar transmissions.

In some of these embodiments, it is checked if the oscillating RSSI level has a periodicity. Periodicity may be detected e.g. by a Fourier analysis or a Fast Fourier analysis of a graph or table showing the RSSI levels over time. If it does not have a periodicity, it is not assumed that a pulsed transmission is detected. Here, "periodicity" includes a case where the period cannot be determined exactly but with some acceptable error. Such an error might be caused e.g. by the sampling of the radar signal with the fixed period of CRS, which may be incommensurate to the period of the radar transmission. By looking for a periodicity, the accuracy of detection (probability of wrong positive detections or wrong negative detections) may be adapted to the specific needs.

Figure 5:
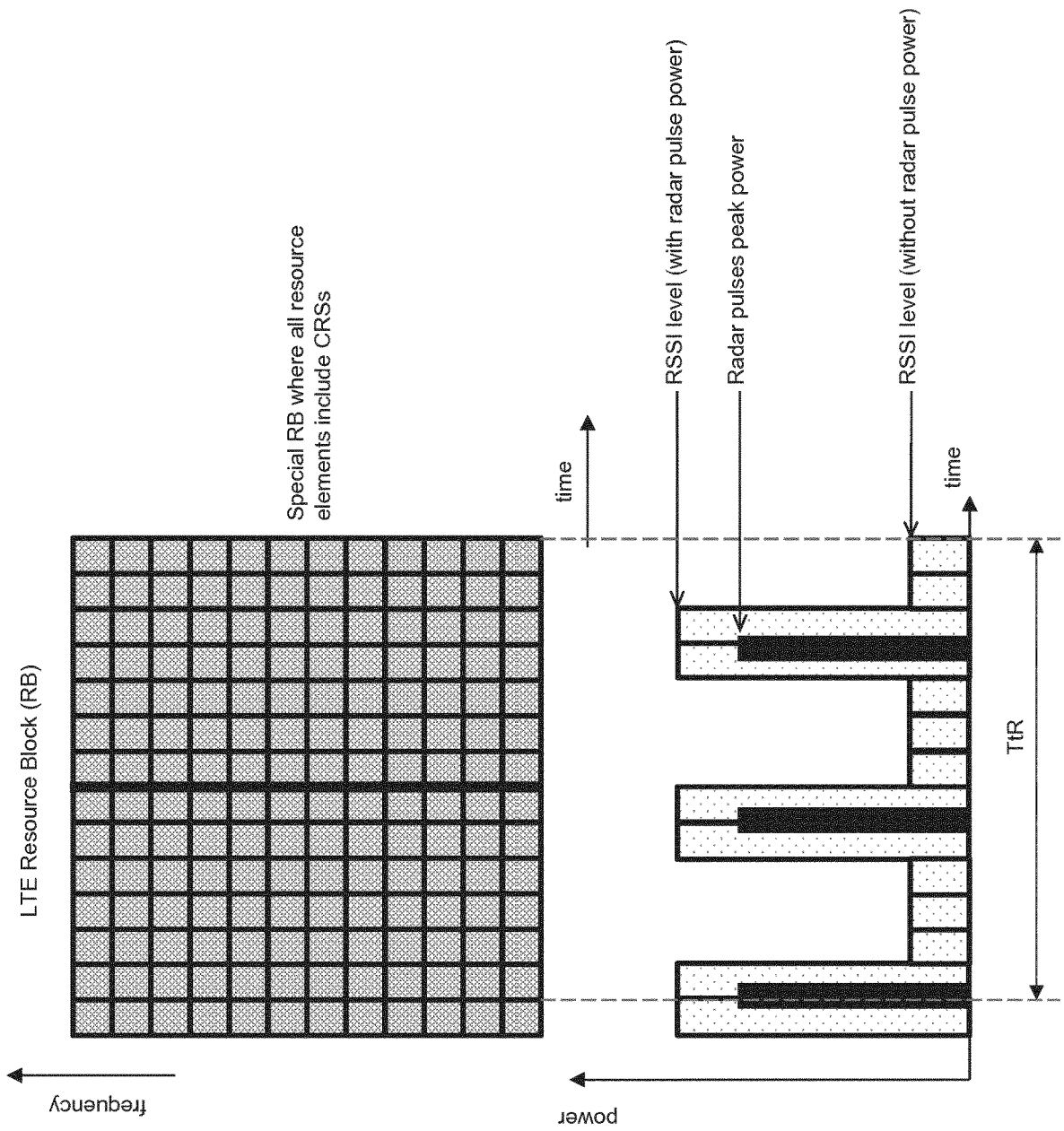
FIG. 5 illustrates Event 3 according to an example embodiment of the invention.

FIG. 5 illustrates Event 3 based on the scenario of FIG. 1. As shown in the top part, in a special RB used for the detection of Event 3, all resource elements include CRSs. In the bottom part of FIG. 5, RSSI of the received signals is shown over time (in symbol times). As may be seen in the bottom part of FIG. 5, RSSI level at symbol times affected by the radar transmission is significantly higher than that at symbol times not affected by the radar transmission. From FIG. 5, a maximum duration of each radar pulse (here: two symbol times) and an approximate periodicity (here: 5 symbol times) may be evaluated. For simplicity, the RSSI levels at symbol times affected by radar transmission are shown with a respective same height, but these heights may be different. Also, the RSSI levels at symbol times not affected by radar transmission are shown with a respective same height, but these heights may be different. However, RSSI levels at symbol times affected by radar transmission and RSSI levels at symbol times not affected by radar transmission are clearly distinguishable from each other. E.g., a minimum of the RSSI levels affected by radar transmission may be at least 50% larger, preferably at least 100% larger, more preferably at least 150% larger than a maximum of the RSSI levels not affected by radar transmission.

Triggered by at least one of Events 1 to 3, UE sends a corresponding measurement report to eNB. UE may send the report immediately or after a given delay, i.e. TtR (Time to Report). TtR may be specified e.g. by time needed for processing measurement results by UE, according to standardization specifications, given UE implementation, or network configuration. TtR may be predefined or network/eNB can configure UE with a certain TtR. E.g., the network/eNB may configure the UE to report the event more frequently, for more dynamic reactions from network side, or to report the event less frequently, for better accuracy due to longer measurement time.

In some embodiments of the invention, the UE analyses the received signals always for occurrence of at least one of Events 1 to 3. However, in some embodiments, the network may configure the UE to look for at least one of Events 1 to 3. For example, the network may have information on areas where radar deployments are possible. If UE is located in such an area, the network (e.g. eNB) may instruct UE to look for at least one of Events 1 to 3. If UE is not located in such an area, the network may instruct UE not to look for these Events. Thus, processing power on the UE may be saved.

ii. Sharing Information With Relevant MBB System Entities

As previously mentioned, according to some embodiments of the invention, an event triggers the UE to report to the base station of the MBB system the detection of incumbent pulsed radar transmissions. In addition, the pattern (such as the duration and period of pulsed transmissions, or the symbols numbers where radar transmissions are present) of the detected pulsed radar transmission may be reported (in particular in case of Event 3). Events 1, 2 and 3 described above are possible triggers for such a reporting message from UE to base station.

By receiving these reports, base station (eNB) may make decisions, such as avoiding any transmission, or avoiding scheduling transmissions in the symbols (time and/or frequency) where radar transmissions occur. Base station may make such a decision locally, i.e., without involving other network elements, or may consider input from other network elements in the decision. In some embodiments, base station may update information in spectrum allocation control entities, such as SAS in the 3.5 GHz band in U.S., which will thus take proper decisions to protect incumbents from interference.

The process of detection of incumbent radars and reporting thereof may also be initiated by the SAS, which may request base stations of MBB system to acquire information about spectrum usage in their areas. Then, base stations may request UEs to perform measurements and observe the presence of events, as the ones described above, and report such events to base stations. These ones could thus provide updated information on channel usage per area to SAS (or generally, a spectrum controller).

A main advantage of some embodiments of the invention is its simplicity in comparison to dedicated network of sensors, like ESC concept in SAS. An additional infrastructure of sensors is not required and, therefore, costs connected with installation and maintenance of such infrastructure are not generated. An additional advantage is the reaction/response speed compared with a dedicated network of sensors requires exchanging information with MBB system. E.g. ESC assumes routing information to SAS and then to CBSD (e.g. LTE eNB) which may take much longer than reporting measurement results from UE to eNB, as according to some embodiments of the invention. This advantage is particularly important as a delay between detection of incumbent operation and MBB system reaction should be as short as possible.

FIG. 6 shows an apparatus according to an example embodiment of the invention. The apparatus may be a terminal such as a UE, or an element thereof. FIG. 7 shows a method according to an example embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises monitoring means 10 and informing means 20. The monitoring means 10 and informing means 20 may be a monitoring circuitry and an informing circuitry, respectively.

The monitoring means 10 monitors if a predefined reference signal is decoded from a received signal (S10). The received signal is received at a predetermined resource element defined by a symbol time and a frequency range.

If the reference signal is not decoded from the received signal (S10="no"), the informing means 20 informs a control device on receipt of an interfering pulsed signal (S20). The control device may be e.g. a base station such as a eNB.

FIG. 8 shows an apparatus according to an example embodiment of the invention. The apparatus may be a terminal such as a UE, or an element thereof. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises monitoring means 110 and informing means 120. The monitoring means 110 and informing means 120 may be a monitoring circuitry and an informing circuitry, respectively.

The monitoring means 110 to monitors if an absolute value of a power difference between a power of a good signal and the power of a poor signal (=|quality of good signal−quality of poor signal|) is less than a predefined power difference threshold (S110). In addition, the monitoring means 110 monitors if a quality difference between a quality of the good signal and the quality of the poor signal (=quality of good signal−quality of poor signal) is larger than a predefined quality difference threshold (S115). The power may be a RSRP. The quality may be a RSRQ. The monitoring means may monitor the power and the quality simultaneously or one after the other in an arbitrary sequence.

A predefined first reference signal is decoded from the good signal which is received at a predetermined first symbol time. A predefined second reference signal is decoded from the poor signal which is received at a predetermined second symbol time. The predetermined first symbol time is different from the predetermined second symbol time. I.e., the first symbol time may be earlier or later than the second symbol time. The quality of the good reference signal is higher than that of the poor reference signal. The first reference signal may be the same as the second reference signal or different therefrom.

If the absolute value of the power difference is less than the predefined power difference threshold and the quality difference is larger than the predefined quality difference threshold (S110="yes"), the informing means 120 informs a control device on receipt of an interfering pulsed signal (S120). The control device may be e.g. a base station such as a eNB.

Figure 11:
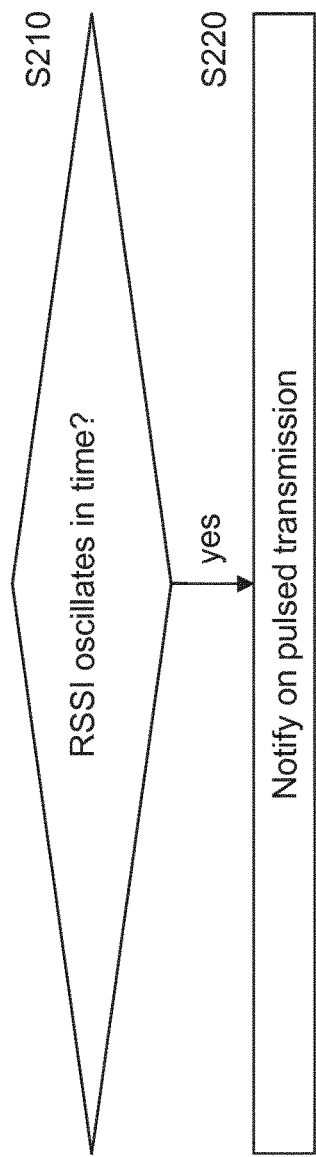
FIG. 11 shows a method according to an example embodiment of the invention.
Figure 10:
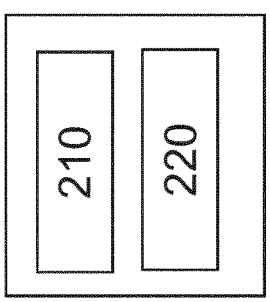
FIG. 10 shows an apparatus according to an example embodiment of the invention.

FIG. 10 shows an apparatus according to an example embodiment of the invention. The apparatus may be a terminal such as a UE, or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises monitoring means 210 and informing means 220. The monitoring means 210 and informing means 220 may be a monitoring circuitry and an informing circuitry, respectively.

The monitoring means 210 monitors if a total received power on a frequency range oscillates in time during a time period (S210). The frequency range and the time period are allocated to exclusively receiving signals carrying reference signals.

If the total received power oscillates in time (S210="yes"), the informing means 220 informs a control device on receipt of an interfering pulsed signal (S220).

Figure 13:
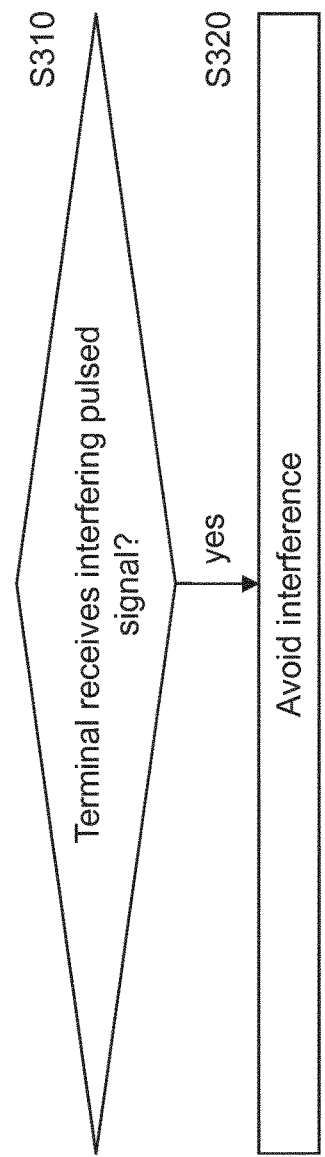
FIG. 13 shows a method according to an example embodiment of the invention.
Figure 12:
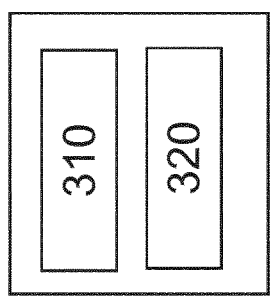
FIG. 12 shows an apparatus according to an example embodiment of the invention.

FIG. 12 shows an apparatus according to an example embodiment of the invention. The apparatus may be a control device such as a base station (eNB) or an SAS, or an element thereof. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises monitoring means 310 and modifying means 320. The monitoring means 310 and modifying means 320 may be a monitoring circuitry and a modifying circuitry, respectively.

The monitoring means 310 monitors if an information is received from a terminal (S310). According to the information, the terminal receives an interfering pulsed signal.

If the information on receipt of the interfering pulsed signal is received (S310="yes"), the modifying means 320 modifies a resource allocation for the terminal such that an interference with the pulsed signal is avoided (S320). For example, the modifying means may inhibit scheduling of transmissions to/from the terminal during pulses of the interfering pulsed signal.

Figure 14:
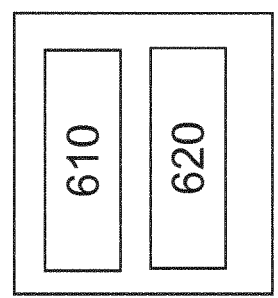
FIG. 14 shows an apparatus according to an example embodiment of the invention.

FIG. 14 shows an apparatus according to an example embodiment of the invention. The apparatus comprises at least one processor 610, at least one memory 620 including computer program code, and the at least one processor 610, with the at least one memory 620 and the computer program code, being arranged to cause the apparatus to at least perform at least one of the methods according to FIGS. 7, 9, 11, and 13 and related description.

Embodiments of the invention are described with reference to radar as an interfering pulsed signal. In this context, radar may be any radiation in the frequency range of 3 MHz to 110 GHz (see https://en.wikipedia.org/wiki/Radar). However, the invention is not limited to radar. Other pulsed transmissions may cause an interfering pulsed signal, too.

E.g., a pulsed transmission in a frequency band different from that of the downlink of the UE may have side lobes which cause interference in the downlink of the UE.

Also, the pulsed signal is not limited to detection purposes such as airplane detection, vehicle detection etc. The pulsed signal may be transmitted e.g. for communication purposes instead.

Compared to the average transmissions of an apparatus according to an embodiment of the invention, the pulsed signal typically has a low duty cycle and a short dwell time. In particular, a pulsed signal is one the presence of which can be detected by at least one of the above described Events 1 to 3.

Embodiments of the invention are explained with reference to LTE. However, they may be based on other mobile communication technologies, too, such as UMTS, GPRS, LTE-A, if they provide a corresponding framework of measurement and reports.

Embodiments of the invention are explained with reference to CRS. However, instead of (or in addition to) CRS, other reference signals (such as a positioning reference signal or a channel state information reference signal) may be used as long as the UE expects to receive these reference signals at predetermined times and frequencies. The reference signals of a resource block may be transmitted at a same frequency or at different frequencies. The reference signals as such and the resource element(s) of their transmissions are known in advance to both the eNB and the UE.

Embodiments of the invention are explained for a case that an MBB system is added to an incumbent system using the same spectrum. However, they may be applied to a case where the MBB system is the incumbent system and another system transmitting pulsed signals is added.

In some embodiments of the invention, only one of the above described Events 1 to 3 is detected. In other embodiments of the invention, two or three of Events 1 to 3 are detected. In these embodiments, the UE may inform the network on the presence of a pulsed transmission if one of these Events occurs or only if two or three of these events occur substantially simultaneously. Thus, accuracy of detection may be adapted to the needs.

Each of the parameters discussed hereinabove for usage in the UE may be predefined or configured by the network. Also, the parameters used by the network may be predefined or determined by the network based on some condition.

One piece of information may be transmitted in one or plural messages from one entity to another entity. Each of these messages may comprise further (different) pieces of information.

A terminal may be a UE, such as a mobile phone, a smart phone, a laptop, a machine-type communication device, or any other terminal suitable to be connected to the respective radio communication network.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example a terminal such as a UE, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a control entity such as a eNB, a NodeB, a radio network controller, or a spectrum access system or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques, means, entities, units, devices, or methods include, as non-limiting examples, implementations as hardware, software, firmware, special purpose circuits or logic, general purpose hardware or controller or other computing devices, a virtual machine, or some combination thereof. Some implementations of the above described blocks, apparatuses, systems, techniques, means, entities, units, devices, or methods include, as non-limiting examples, implementations by shared processing resources, i.e. may be implemented in a cloud.

It should be noted that the description of the embodiments is given by way of example only and that various modifications may be made without departing from the scope of the invention as defined by the appended claims.

The invention claimed is:

1. An apparatus, comprising:
monitoring means for monitoring if a predefined reference signal is decoded from a received signal, wherein the received signal is received at a predetermined resource element defined by a symbol time and a frequency range; and
informing means for informing another apparatus on receipt of an interfering pulsed signal if the reference signal is not decoded from the received signal,
wherein the monitoring means is for monitoring if a power of the received signal is larger than a predefined power threshold, and
wherein the apparatus further comprises inhibiting means for inhibiting the informing means from informing the another apparatus if the reference signal is not decoded from the received signal and the power is not larger than the predefined power threshold.

2. The apparatus according to claim 1, wherein
the monitoring means is for monitoring if plural poor signals are received at respective different predetermined symbol times in a predetermined time period, wherein a respective reference signal is not decoded from each of the poor signals; and the apparatus further comprises
prohibiting means for prohibiting the informing means to inform the another apparatus if the monitoring means does not monitor that plural poor signals are received.

3. The apparatus according to claim 2, further comprising analyzing means for analyzing if the poor signals are received with a periodicity; wherein at least one of the informing means is for informing the another apparatus on the periodicity if the poor signals are received with the periodicity; and the prohibiting means is for prohibiting the informing means to inform the another apparatus if the poor signals are not received with the periodicity.

4. The apparatus according to claim 2, wherein the monitoring means is for monitoring if one or more good signals are received at respective predetermined symbol times between the predetermined symbol times, at which subsequently received poor signals of the poor signals are received, wherein a respective reference signal is decoded from each of the one or more good signals; wherein the prohibiting means is for prohibiting the informing means to inform the another apparatus if a good signal is not received between the subsequently received poor signals.

5. An apparatus, comprising:

at least one processor; and at least one memory including computer code, wherein the at least one memory and the computer code are configured to, with the at least one processor, cause the apparatus at least to monitor if a predefined reference signal is decoded from a received signal, wherein the received signal is received at a predetermined resource element defined by a symbol time and a frequency range;

inform a another apparatus on receipt of an interfering pulsed signal if the reference signal is not decoded from the received signal;

monitor if a power of the received signal is larger than a predefined power threshold; and inhibit the informing of the another apparatus if the reference signal is not decoded from the received signal and the power is not larger than the predefined power threshold.

6. The apparatus according to claim 5, wherein the at least one memory and the computer code are configured to, with the at least one processor, further cause the apparatus to:

monitor if plural poor signals are received at respective different predetermined symbol times in a predetermined time period, wherein a respective reference signal is not decoded from each of the poor signals; and prohibit the informing of the another apparatus if the apparatus does not monitor that plural poor signals are received.

7. The apparatus according to claim 6, wherein the at least one memory and the computer code are configured to, with the at least one processor, further cause the apparatus to:

analyze if the poor signals are received with a periodicity; wherein at least one of the informing the another apparatus on the periodicity if the poor signals are received with the periodicity; and the prohibiting the informing of the another apparatus if the poor signals are not received with the periodicity.

8. The apparatus according to claim 6, wherein the at least one memory and the computer code are configured to, with the at least one processor, further cause the apparatus to:

monitor if one or more good signals are received at respective predetermined symbol times between the predetermined symbol times, at which subsequently received poor signals of the poor signals are received, wherein a respective reference signal is decoded from each of the one or more good signals; and prohibit the informing of the another apparatus if a good signal is not received between the subsequently received poor signals.

9. An apparatus, comprising:

at least one processor; and at least one memory including computer code, wherein the at least one memory and the computer code are configured to, with the at least one processor, cause the apparatus at least to monitor if a predefined reference signal is decoded from a received signal, wherein the received signal is received at a predetermined resource element defined by a symbol time and a frequency range;

inform another apparatus of another apparatus on receipt of an interfering pulsed signal if the reference signal is not decoded from the received signal;

monitor if plural poor signals are received at respective different predetermined symbol times in a predetermined time period, wherein a respective reference signal is not decoded from each of the poor signals; and prohibit the informing of the another apparatus if the apparatus does not monitor that plural poor signals are received.

10. The apparatus according to claim 9, wherein the at least one memory and the computer code are configured to, with the at least one processor, further cause the apparatus to:

monitor if a power of the received signal is larger than a predefined power threshold; and inhibit the informing of the another apparatus if the reference signal is not decoded from the received signal and the power is not larger than the power threshold.

11. The apparatus according to claim 9, wherein the at least one memory and the computer code are configured to, with the at least one processor, further cause the apparatus to:

analyze if the poor signals are received with a periodicity; wherein at least one of the informing the another apparatus on the periodicity if the poor signals are received with the periodicity; and the prohibiting the informing of the another apparatus if the poor signals are not received with the periodicity.

12. The apparatus according to claim 9, wherein the at least one memory and the computer code are configured to, with the at least one processor, further cause the apparatus to:

monitor if one or more good signals are received at respective predetermined symbol times between the predetermined symbol times, at which subsequently received poor signals of the poor signals are received, wherein a respective reference signal is decoded from each of the one or more good signals; and prohibit the informing of the another apparatus if a good signal is not received between the subsequently received poor signals.

13. An apparatus, comprising:

monitoring means for monitoring if a predefined reference signal is decoded from a received signal, wherein the received signal is received at a predetermined resource element defined by a symbol time and a frequency range; and informing means for informing another apparatus of another apparatus on receipt of an interfering pulsed signal if the reference signal is not decoded from the received signal, wherein the monitoring means is for monitoring if plural poor signals are received at respective different predetermined symbol times in a predetermined time period, wherein a respective reference signal is not decoded from each of the poor signals, and wherein the apparatus further comprises prohibiting means for prohibiting the informing means to inform the another apparatus if the monitoring means does not monitor that plural poor signals are received.

14. The apparatus according to claim 13, further comprising analyzing means for analyzing if the poor signals are received with a periodicity; wherein at least one of the informing means is for informing the another apparatus e on the periodicity if the poor signals are received with the periodicity; and the prohibiting means is for prohibiting the informing means to inform the another apparatus if the poor signals are not received with the periodicity.

15. The apparatus according to claim 13, wherein the monitoring means is for monitoring if one or more good signals are received at respective predetermined symbol times between the predetermined symbol times, at which subsequently received poor signals of the poor signals are received, wherein a respective reference signal is decoded from each of the one or more good signals, and wherein the prohibiting means is for prohibiting the informing means to inform the another apparatus if a good signal is not received between the subsequently received poor signals.

* * * * *